United States Patent
Endres et al.

(10) Patent No.: US 10,252,476 B2
(45) Date of Patent: Apr. 9, 2019

(54) REPEATING UNIT, MULTI-NEEDLE MACHINE AND METHOD FOR PRODUCING REINFORCED MATERIALS

(71) Applicants: Airbus Defence and Space GmbH, Ottobrunn (DE); Airbus Operations GmbH, Hamburg (DE)

(72) Inventors: Gregor Christian Endres, Pfaffenhofen (DE); Hans-Jürgen Weber, Hamburg (DE)

(73) Assignees: Airbus Defence and Space GmbH, Ottobrunn (DE); AIRBUS OPERATIONS GMBH, Hamburg (DE)

( * ) Notice: Subject to any disclaimer, the term of this patent is extended or adjusted under 35 U.S.C. 154(b) by 290 days.

(21) Appl. No.: 15/031,836

(22) PCT Filed: Oct. 23, 2014

(86) PCT No.: PCT/EP2014/072716
§ 371 (c)(1),
(2) Date: Apr. 25, 2016

(87) PCT Pub. No.: WO2015/059218
PCT Pub. Date: Apr. 30, 2015

(65) Prior Publication Data
US 2016/0263841 A1    Sep. 15, 2016

(30) Foreign Application Priority Data
Oct. 25, 2013  (DE) .......................... 10 2013 111 794

(51) Int. Cl.
*B29C 70/24* (2006.01)
*D04H 18/02* (2012.01)
(Continued)

(52) U.S. Cl.
CPC ............ *B29C 70/24* (2013.01); *B29C 70/086* (2013.01); *D04H 18/02* (2013.01);
(Continued)

(58) Field of Classification Search
CPC ............ D04H 1/45; D04H 1/46; D04H 3/102; D04H 3/105; D04H 3/115; D04H 5/02;
(Continued)

(56) References Cited

U.S. PATENT DOCUMENTS

| 13,966 A | * | 12/1855 | Singer | ................... | D05B 61/00 |
| | | | | | 112/475.17 |
| 344,492 A | * | 6/1886 | Muther | .................. | D05B 61/00 |
| | | | | | 112/475.17 |

(Continued)

FOREIGN PATENT DOCUMENTS

| CN | 101440554 A | 5/2009 |
| DE | 10 2005 024 408 A1 | 11/2006 |

(Continued)

OTHER PUBLICATIONS

State Intellectual Property Office of the Peoples Republic of China, Office Action in Chinese Patent Application No. 201480058715.0 dated Feb. 6, 2017.

(Continued)

*Primary Examiner* — Amy Vanatta
(74) *Attorney, Agent, or Firm* — Lorenz & Kopf LLP (57) ABSTRACT

The embodiment relates to the production of reinforced materials, for example reinforced foam materials or reinforced textiles. A multi-needle machine is provided with a plurality of serially arranged repeating units, which are able to move sliders and pins toward and past each other along a circular path so as to create the semi-finished textile products. In this way, it is possible to reinforce components with curved surfaces.

9 Claims, 3 Drawing Sheets

(51) Int. Cl.
*B29C 70/08* (2006.01)
*B29K 105/04* (2006.01)
*B29L 31/08* (2006.01)
*B29L 31/30* (2006.01)

(52) U.S. Cl.
CPC ..... *B29K 2105/04* (2013.01); *B29L 2031/085* (2013.01); *B29L 2031/30* (2013.01); *Y02P 70/523* (2015.11)

(58) Field of Classification Search
CPC . D04H 5/08; D04H 5/10; D04H 11/04; D04H 13/005; D04H 18/02; B29C 70/24; B29C 70/086; D05C 15/00; D05C 15/08; D05C 15/10; D05C 15/12; D05C 15/14; D05C 15/16; D05C 15/18; D05C 15/20; D05C 15/38; D05B 39/00; D05B 61/00; D05B 27/00; D05B 35/00; D05B 85/00
USPC .......................................................... 28/107
See application file for complete search history.

(56) References Cited

U.S. PATENT DOCUMENTS

| | | | | |
|---|---|---|---|---|
| 1,793,866 A * | 2/1931 | Myers | .................... | D05C 15/00 112/80.17 |
| RE19,653 E * | 7/1935 | Naftali et al. | ......... | D05B 39/00 112/171 |
| 2,345,104 A * | 3/1944 | Dittrich | .................. | D05B 39/00 112/118 |
| 3,033,139 A | 5/1962 | Toshio | | |
| 4,515,096 A * | 5/1985 | Ingram | .................. | D05C 15/20 112/80.4 |
| 4,754,718 A * | 7/1988 | Watkins | .................. | D05C 15/12 112/80.52 |
| 5,048,438 A * | 9/1991 | Jimenez | ............... | D05B 57/143 112/184 |
| 7,251,871 B2 * | 8/2007 | Delecroix | ............ | D04H 1/4242 28/101 |
| 2003/0145898 A1 | 8/2003 | Bassi et al. | | |
| 2005/0235471 A1* | 10/2005 | Delecroix | .............. | D04H 1/498 28/107 |
| 2009/0252917 A1* | 10/2009 | Weber | ..................... | B29C 44/56 428/102 |
| 2010/0236212 A1* | 9/2010 | Weber | ..................... | B29C 70/24 57/267 |
| 2010/0263504 A1 | 10/2010 | Rippert et al. | | |
| 2011/0275266 A1* | 11/2011 | Lecostaouec | ........... | B29B 11/16 442/240 |

FOREIGN PATENT DOCUMENTS

DE 102011007020 A1 10/2012
WO 2012136394 A1 10/2012

OTHER PUBLICATIONS

International Searching Authority, International Search Report for International Application No. PCT/EP2014/072716 dated Dec. 18, 2014.

* cited by examiner

REPEATING UNIT, MULTI-NEEDLE MACHINE AND METHOD FOR PRODUCING REINFORCED MATERIALS

CROSS-REFERENCE TO RELATED APPLICATIONS

This is a continuation of International Application No. PCT/EP2014/072716, filed Oct. 23, 2014, which application claims priority to German Application No. 10 2013 111 794.5, filed Oct. 25, 2013, which are hereby incorporated by reference in their entirety.

TECHNICAL FIELD

The embodiments described herein relate to the production of reinforced materials. In particular, the embodiment relates to a repeating unit for a feed device of a multi-needle machine for positioning a semi-finished textile product, for example a fibre, a thread or a roving, a multi-needle machine for producing reinforced foams, reinforced textiles or combinations thereof, the use of a multi-needle machine for producing reinforced foams, reinforced textiles or combination thereof, the use of a multi-needle machine for producing a structural element for a vehicle, the use of a multi-needle machine for producing a blade of a wind turbine and a method for producing reinforced foams, reinforced textiles or combinations thereof.

BACKGROUND

In addition, other objects, desirable features and characteristics will become apparent from the subsequent summary and detailed description, and the appended claims, taken in conjunction with the accompanying drawings and this background.

Because of the good ratio of stiffness and strength to density they exhibit, composite materials and particularly sandwich components are used widely in aircraft construction. Such composite materials, for example core structure textile materials or other core composites, are generally constructed from an upper and a lower cover layer or surface layer, between which a honeycomb-like core structure consisting of vertically oriented cells having a hexagonal cross section may be positioned to increase the structure's stiffness.

The multifunctionality of foams renders them of interest for use in core composites for large structural elements, e.g. in aviation applications, both for the manufacturing of components and with regard to the enhanced properties of the components themselves. For reinforcement of the foambased core composites, certain sewing techniques are used with which it is possible to incorporate fibres or threads referred to in the following as semi-finished textile products in hard foam components. Following a resin infiltration process, the zones through which the fibres pass then increase the mechanical reinforcement of the foam.

The fibres or threads that are added for reinforcement may be in the form of "rovings", which consist of fibres in parallel alignment, or they may be threads, which consist of twisted or wound fibres.

In known sewing methods, initially a needle is inserted into the foam, and passes through it. The needle brings the thread into the foam at the same time. In this operation, while it is being inserted in the foam, the thread extends parallel to and substantially over the entire length of the needle. The size of the perforation hole is thus determined by the diameter of the needle and the thickness of the thread.

After the needle has been withdrawn from the foam or textile, a hole remains the diameter of which is relatively large compared with the diameter of the thread that is introduced. This results in that, after the infiltration with a resin the area of the hole that is not occupied by fibres is filled with resin, which can add to the weight of the finished component.

DE 10 2005 024 408 A1 describes the reinforcement of foam materials by means of a knotting process, in which the needle first passes through the material to be reinforced (the foam material) and only then picks up the semi-finished textile product in the area of the foam material underside, and then pulls it through the perforation with the subsequent backwards movement.

This technique enables the hole diameter to be kept relatively small.

SUMMARY

One object of the embodiments described herein to enable reinforced, large-scale materials with curved surfaces to be produced at high speed.

According to a first aspect of the embodiment, a repeating unit for a feed device of a multi-needle machine is specified. Possibly in combination with further repeating units, the function of the repeating unit is to arrange a semi-finished textile product along a non-straight, cyclical path in the area of a rear surface of the material that is to be reinforced.

The materials that are to be reinforced are for example foam materials or other materials suitable for use as the core material in core composites. Alternatively to foam materials, textiles such as felts, non-woven fibre fabrics or rubber materials are possible. The semi-finished textile products used for reinforcing the materials may be fibre bundles in the form of rovings created from a plurality of single fibres or monofilaments, single fibres themselves and threads created by twisting single fibres or fibre bundles.

The phrase "to arrange a semi-finished textile product along a non-straight, cyclical path in the area of a rear surface of the material that is to be reinforced" can mean that the semi-finished textile product is arranged close to the rear surface of the material that is to be reinforced in a wavy, zigzag or trapezoidal pattern, so that it may subsequently by picked up by the needles.

To achieve this, two devices are provided. On the first device, at least one slider (or alternatively a pin) is mounted, and at least one pin is mounted on the second device. For example, two pins are mounted on the second device.

It should be noted that in the following text, reference will be made consistently to a "slider" in connection with the first device; however, it is not excluded for the slider to be arranged fixedly on the first device, and to have the same construction as the pin of the second device.

At least one of the two devices (that is to say either the first or the second device) is supported so as to be rotatable about a rotary axis. A rotation of the rotatably mounted device thus causes the slider or the one or more pin(s) to move along a circular path, and in so doing to move toward its corresponding counterpart (the one or more pin(s) or the slider) and then past it.

In particular, it may be provided that both devices are mounted so as to be rotatable about a common rotary axis. It may also be provided that both devices are mounted so as to be rotatable about their own rotary axis, wherein the two axes of rotation are aligned substantially parallel to one another.

This relative movement between slider and pin(s) makes it possible for the semi-finished textile product to be transferred from a straight, linear arrangement into the cyclical, non-straight arrangement, since it is picked up and displaced by the slider and the pin.

Due to the rotation of slider and/or pin on a circular path, it is possible in particular to reinforce curved or even cylindrical surfaces. In particular, the repeating unit may be pushed inside the cylinder of a cylindrical material to be reinforced.

The materials to be reinforced may be sandwich components which have one or more intermediate and/or cover layers besides a core material.

In this way, core composite components can be manufactured that may be flat components with bigonal, overlaid surfaces and, in the simplest case, with two parallel opposing surfaces. Such components frequently show two- or three-dimensional curvatures, or thicknesses that vary over the extension of the components.

The foam material may be a PMI hard foam for example. However, other foams consisting for example of polyvinyl chloride or polyurethane may also be used.

A further aspect of the relates to a multi-needle machine for producing reinforced foams, reinforced textiles or combinations thereof, which comprises multiple repeating units such as have been described above and will be described further in the following, and which are mounted on a common axle and at a distance from each other.

The feed of the semi-finished textile product (roving feed) may be provided individually for each repeating unit or for several repeating units together.

In other words, multiple roving feeds may be provided, wherein each serves one or more repeating units.

A further aspect relates to the use of such a multi-needle machine to produce reinforced foams, for manufacturing a structural element of a vehicle and for manufacturing a wind turbine blade.

A further aspect relates to a method for producing reinforced foams, reinforced textiles or combinations thereof, in which initially a semi-finished textile product is arranged along a straight path in the area of a rear surface of a material that is to be reinforced. Then, a displacement of the semi-finished textile product takes place so that afterwards it lies along a non-straight, cyclical path in the area of the rear surface of the material that is to be reinforced. The displacement is brought about by at least one slider and at least one pin, wherein the slider or at least the one pin is moved along a circular path and past the at least one pin or the slider.

A plurality of needles is pushed through the material to be reinforced either before or after the semi-finished textile product is fed along the non-straight path, so that the individual needles pass through the rear surface of the material. Then, after the semi-finished textile product has been inserted in the individual needles, the needles are retracted out of the material, so that each of said needles pulls a portion of the semi-finished textile product into the material, through one of the needles in each case.

It is important during this operation that a sufficient quantity of the semi-finished textile product has been fed into position, because it is then pulled out through the corresponding hole by each individual needle in the portion, so that it completely fills the hole.

Different thicknesses of the material to be reinforced may be compensated for by respectively setting the angle of rotation of the repeating unit that is working in this area. A large angle of rotation corresponds to a large feed length of the semi-finished textile product in this area, and a smaller angle of rotation corresponds to a shorter feed length. Thus, if the material is relatively thick in a certain area, the size of the angle of rotation of the first and/or second device of the corresponding repeating unit is set accordingly large.

This does not then create a cyclical, non-straight path of the semi-finished textile product in the stricter sense as it is advanced, but rather a zigzag, wavy or trapezoidal path, or some other pattern that runs back and forth with an "amplitude" of varying height (in other words varying deflection from the original primary path direction of the semi-finished textile product, which runs parallel to the rotary axis 12).

This is for example a knotting method and not a sewing method, in which the semi-finished textile product is at first present solely on the rear surface of the material to be reinforced, but not on the front side. Since the needles are moved simultaneously, production speed is increased considerably.

According to a further variant, the repeating unit has a cylindrical housing, in which the first device and the second device are disposed.

According to a further variant, the first device is designed in the form of a cylindrical housing, in which the second device is disposed. In this case, therefore, a separate housing that accommodates both devices is not provided.

According to a further variant, two pins are mounted on the second device, parallel to one another and radially with respect to the axle. The rotation of the second device relative to the first device causes the pins to move, which movement takes the pins past the slider on opposite sides thereof. This movement is carried out along a circular path.

Alternatively, or in addition, the first device may also be rotated about the axle, but in the opposite direction.

According to a further variant, the repeating unit has a first linear guide, which is aligned radially with respect to the linear guide of the slider. In this way it is possible for the slider to be pushed downwards towards the axle after the cyclical pattern of the advancing semi-finished textile product has been formed, thereby transferring the semi-finished textile product to the corresponding needle.

According to a further variant of the embodiment, the repeating unit has a second linear guide ("roving feed"), which passes through the first device and the second device parallel to the axle, and has a carriage, which is designed to feed the semi-finished textile product between the slider and the first pin along a straight path.

It should be noted that the features of the repeating unit described here and in the following text may relate to all, or only to some repeating units of the multi-needle machine.

According to a further variant, the multi-needle machine comprises a needle beam that supports a plurality of needles and that is disposed in the area of the front surface of the material that is to be reinforced. The multi-needle machine is designed to pick up the material to be reinforced between the needle beam and the repeating units.

According to a further variant, the distances between adjacent repeating units are variable according to the desired stitch pattern.

According to a further variant, at least the first device or the second device of one or more or indeed of all the repeating units may be rotated through an individually predefinable, variable angle. This angle of rotation may particularly be set in accordance with the predominant thickness of the material to be reinforced in the effective area of the repeating unit. It may be provided that the multi-needle machine itself determines the thickness of the material to be reinforced, and accordingly the maximum a angle of rotation of the repeating units as well.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

Where the same reference numbers are used in different figures of the following description of the figures, they denote identical or similar elements. However, identical or similar elements may also be denoted by different reference signs.

Figure 1:
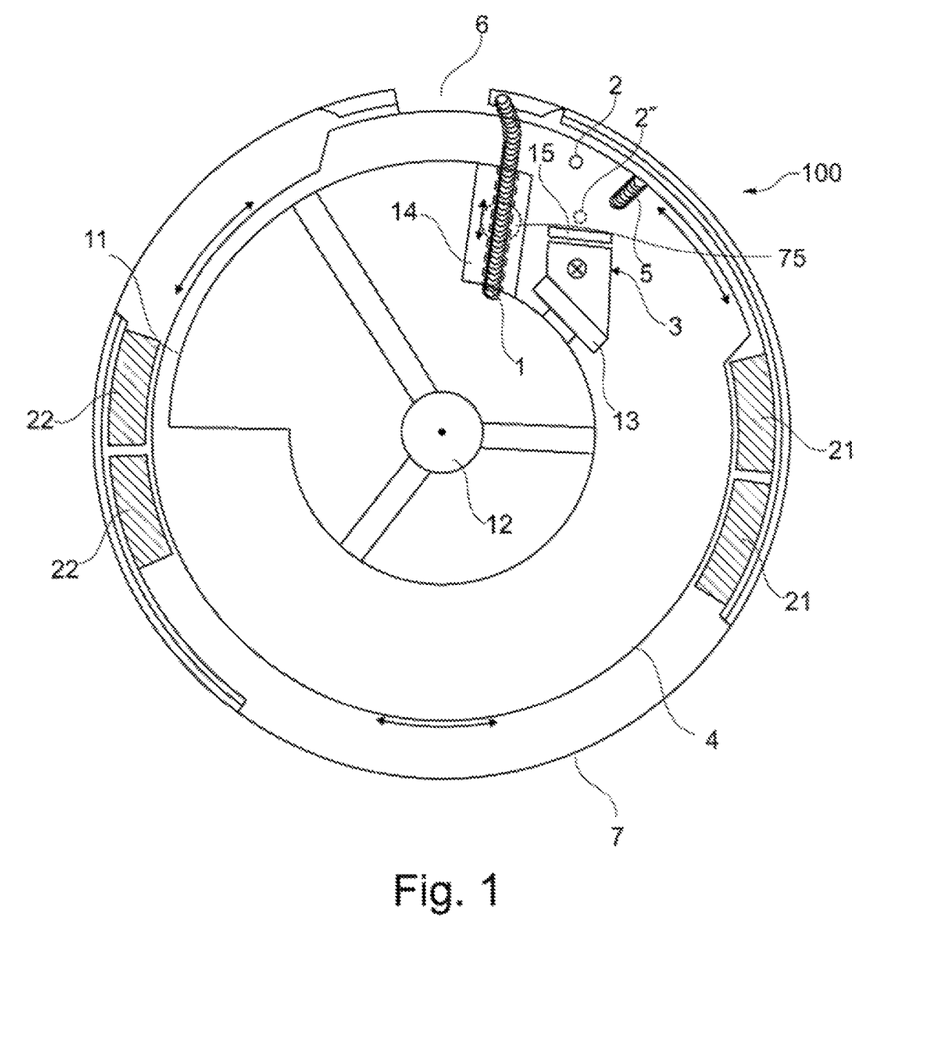
FIG. 1 shows a repeating unit for a feed device of a multi-needle machine according to an embodiment.

FIG. 1 shows a repeating unit 100 for a feed device of a multi-needle machine for positioning a semi-finished textile product 2 along a cyclical, for example a wavy, trapezoidal, zigzag or other non-straight path, which has an alternatingly positive and negative gradient with respect to the primary path direction thereof.

The repeating unit 100 is provided for installation in a feed device of a multi-needle machine 200 (see FIG. 3) and is designed to be mountable on an axle 12 of the multi-needle machine.

With the aid of this repeating unit, it is possible to create the desired cyclical or at least upward and downward (or back and forth) pattern of the semi-finished textile product. The repeating unit is cylindrical in shape, for example. However, a plane or other spatial design is also possible.

One reason for the choice of a cylindrical shape is that this makes it possible to process cylindrical preforms. These may be core composites as well as purely textile preforms. The choice of a cylindrical shape also simplifies the processing and/or production of simply curved reinforced component. This is advantageous, because most of the geometrical shapes encountered often only have a one-dimensional curvature, or they are composed of segments that can be reduced to bodies with a simple curvature.

Each repeating unit is constructed from the following elements and functions:

Seen from the outside looking in, first a complete cylinder 7 is provided, the upper side of which is furnished with a cutaway 6 for a stitch hole. Curved guide elements 21, 22 are mounted on the inside thereof, as shown for exemplary purposes in FIG. 1. For optimal seating, these guide elements are offset by 180 degrees relative to each other, and by 90 degrees relative to cutaway 6 of the stitch hole. The distance to the stitch hole is necessary, because otherwise the loop formation and capture of the loop in the needle might be impeded.

A geometrically modified cylinder 4 (for exemplary purposes) is mounted on the described guidance system 21, 22. One or two pin(s) 5 is/are "suspended" on this cylinder, and is/are able to execute a movement on a circular path due to the movable bearing of cylinder 4. The cylinder 4 is also referred to as the "second device" in the scope of the present application.

The upper segment of the movable cylinder 4 is slotted so that a movable slider 1 may be guided through it and advanced into a recess in the housing cylinder 7 by linear movement. The slider 1 is mounted on a statically supported or also rotatable, geometrically modified cylinder ("first device") 11. In order to enable the slider 1 to move in the direction of the rotary axis 12, a first linear guide 14 is provided that guides the slider 1 linearly in radial direction.

Besides, the slider 1, a feed mechanism 3 is mounted that has a second linear guide 13, which passes through all disc segments (first and second devices 11, 4, and housing 7 if present). A carriage 15 on said guide 13 feeds the semi-processed textile product 2 between the slider 1 and the one or more pin(s) 5 along a straight running path.

In an alternative embodiment, it may be provided that the semi-processed textile product is initially fed at a smaller distance from axis 12, as is indicated by dashed circle 2". In this way, it is possible for two processes to take place simultaneously: Firstly, the (linear) feed of a first strand of semi-finished textile product in area 2", and simultaneously the offset of a second strand of semi-finished textile product 2 by rotation of the first device and/or the second device.

Then, when the needles have pulled the semi-finished textile product through the holes upwards through the material to be reinforced, the semi-finished textile product 2" is able to be guided radial outwards into the area of the stitch hole. A lifting mechanism may be provided for this, and may be integrated in the feed mechanism 3.

The feed mechanism 3 may also be designed to provide an individual semi-finished textile product for each individual repeating unit. In this way, it may be provided that an individually allocated thread, fibre or roving is fed to each individual repeating unit or each group of repeating units.

The repeating units 100 thus have various concentrically arranged cylinders, cylinder segments or differently shaped elements 7, 4, 11 arranged one inside the other. Overall, the repeating unit may be in the shape of a disc.

The number of stitches that may possibly be performed in parallel is determined by the number of repeating units arranged on axis 12.

In particular, it may be provided that both devices of a repeating unit are mounted so as to be rotatable about a common rotary axis 12. It may also be provided that the two devices are each mounted so as to be rotatable about their own rotary axis 12, 75, wherein the two rotary axes are aligned essentially parallel with one another. This is shown in the embodiment of FIG. 1. In this case, the slider 1 is mounted so as to be rotatable about the axis 75 which is mounted parallel to axis 12, and is located for example at 60% to 70% of the radius of repeating unit 100.

Figure 2:
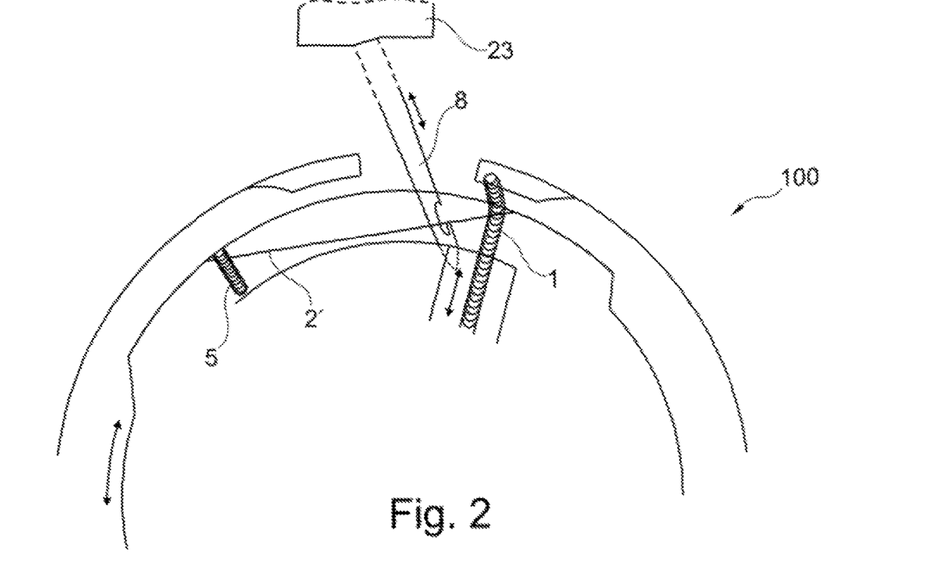
FIG. 2 shows a partial cutaway section of the repeating unit of FIG. 1 with a needle inserted in it.

As may be discerned in FIG. 2, the upper area of slider 1 is curved. This makes it easier for it to slide off semi-finished textile product 2' when the slider is pushed downwards in the radial direction, so that semi-finished textile product 2' can be picked up by the needle 8.

The described repeating units are mounted in such a way that the distance between them can be adjusted flexibly.

Since one needle and thus one stitch is allocated to each repeating unit, the distance between discs 10 (see FIG. 3) determines the (minimum) distance between stitches.

A smaller distance between stitches may be enabled by a lateral offset and therewith a reduction of the distance between adjacent repeating units. And a smaller distance than what is initially geometrically possible between stitches may also be created by a lateral offset of one or more repeating units in the row.

When the clamping device on the carriage has clamped the semi-finished textile product, it can be pulled by the carriage through the repeating units arranged in series. If the textile feed point and the end point are flexibly positionable, fewer stitches can also be produced than the maximum possible with the total unit.

The operating principle behind the components described earlier is as follows: When the semi-finished textile product 2 has been fed between the pins 5 and the slider 1, the cylinder on which the pins 5 are mounted can rotate. At the moment when the pins pass the slider on their circular path, the "zigzag pattern" begins to form (se FIG. 3). As the path travelled (that is to say the angle of rotation of the corresponding device 11, 4) becomes larger, so does the advanced length of semi-finished textile product 2' (see FIG. 2) become large.

In this context, it should be noted that the tension generated on the on the semi-finished textile product and the pins can be controlled by displacing the pins individually or in segments. This may be practical and advantageous, since particularly with a large number of repeating units 100 the tension on the semi-finished textile product may become substantial.

If the segment of movement, in other words the angle of rotation of the corresponding device of each disc unit is controlled individually, an uneven pattern may be generated besides as well as a uniform trapezoidal pattern. This makes it possible to compensate for variations in the thickness of the material to be reinforced. If individual repeating units can also be excluded from the movement, it is also possible to create areas without reinforcement despite of the multiple needles approach.

It may also be provided that two, three or more groups of repeating units are arranged on the axis 12, each being rotated about the axis 12 toward each other by 180 degrees (in the case of two groups) or 120 degrees (in the case of three groups), etc. . . . In this way, it is possible for the multi-needle machine to work simultaneously on two, three or more areas of the material that is to be reinforced. This is possible in particular, when the material to be reinforced has a bend or is even shaped as a cylinder, in which the repeating units are located.

The length of the semi-finished textile product that needs to be advanced is determined by the thickness of the material to be reinforced and the stitching angle at which the needles pass through the material to be reinforced. When the needle 8 has passed through the material that is to be reinforced and the needle tip is in position in the stitch hole (see FIG. 2), the slider 1 may move downwards out of the way. At the same time, the semi-finished textile product slides off of the slider 1 and onto the needle 8. To maintain the tension of the semi-finished textile product, the cylinder 4 may make an additional counter clockwise movement. After placing or inserting the semi-finished textile product on/in the needle, the needle may retract through the material to be reinforced and introduce the semi-finished textile product into the material to be reinforced.

After the needles have been retracted into the material to be reinforced, the pins/slider return to their starting position, so that again semi-finished textile product can be fed. Depending on the spatial and geometrical design of the textile feed, a new semi-finished textile product may be advanced underneath as soon as the slider has completed its travel, and raised up between the slider and the pins at the right moment (see reference sign 2" of FIG. 1).

If the textile is cut between two repeating units, separate, independent reinforcement areas are created. If the textile is not cut, a seam is formed on the underside of the perforated material for reinforcement, since the holes are connected to each other.

If the textile is not cut on the upper side either, and the needle beam 22 pulls the loops of a row through the loops of the previous row (the latter become fixed thereby), the seam profile formed thereby is similar to the single-sided chain stitch. The difference in this case is that the textile comes from below, and not through the needle from above, and that the seam on the underside (determined by the textile feed) may be rotated an angle less than or equal to 90 degrees with respect to the seam on the top side (determined by the row offset).

The description of the structure of the repeating units and the sequence of feeding the semi-finished textile product is provided for exemplary purposes. The string of repeating units and their functions may also be different. For example, it may be provided that it is not the second device but rather the first device which can be rotated, or that both devices can't be rotated in opposite directions to each other.

If the needle bars 8 that are attached to the needle beam can also be rotated axially, 180 degrees of the required pin orientations (of a total of 360 degrees) may be performed according to the principle described above earlier with a lower unit 100 in the basic configuration. The remaining 180 degrees may be achieved by mirroring the structure and the work sequence.

Double functions are generally possible, and these are then able to cover the full 360 degrees (see alternative configuration B in the following).

In a first alternative configuration A, the innermost cylinder (second device 4) has the task of beginning the trapezoidal pattern by performing rotating movements. The counterpart to this is a cylindrical plane mounted farther out (second device 11). The semi-finished textile product is fed between the pins of the two cylindrical planes before the inner cylinder begins moving. Then, when the pins of the inner cylinder pass between those of the outer cylinder or vice versa, the desired pattern is begun. Both two cylinders may be rotated synchronously to introduce the semi-finished textile product into the needle after it has perforated the material, so that the semi-finished textile product is no longer placed by pins (or by one or more slider(s)) of the outer cylinder, but by the needle 8.

In the alternative configuration B, it is possible to create reinforcements having opposite orientation with one unit. In this case, the outer cylinder with stitch hole remains the same as in all other variants. However, the cylinders mounted on the inside (first and second devices 11, 4) are equipped with two thread tensioning devices, which are offset by 180 degrees with respect to each other and are able to create a mirror-symmetrical zigzag pattern. The thread take-off is arranged below the stitch hole. The textile is fed on the underside of the cylinder. The textile pick-up and feed may be performed in parallel. In addition, the textile feed does not necessarily have to be located inside the cylinder, it may also be positioned outside below the cylinder if such is permitted by the geometrical form of the components. The textile can be inserted in the needles (with opposite stitch orientation) by moving the inserted textile clockwise and counter clockwise.

In this way, it is possible to carry out two stitches in different directions (offset by 180 degrees from each other, for example) within a single repeating unit.

Figure 3:
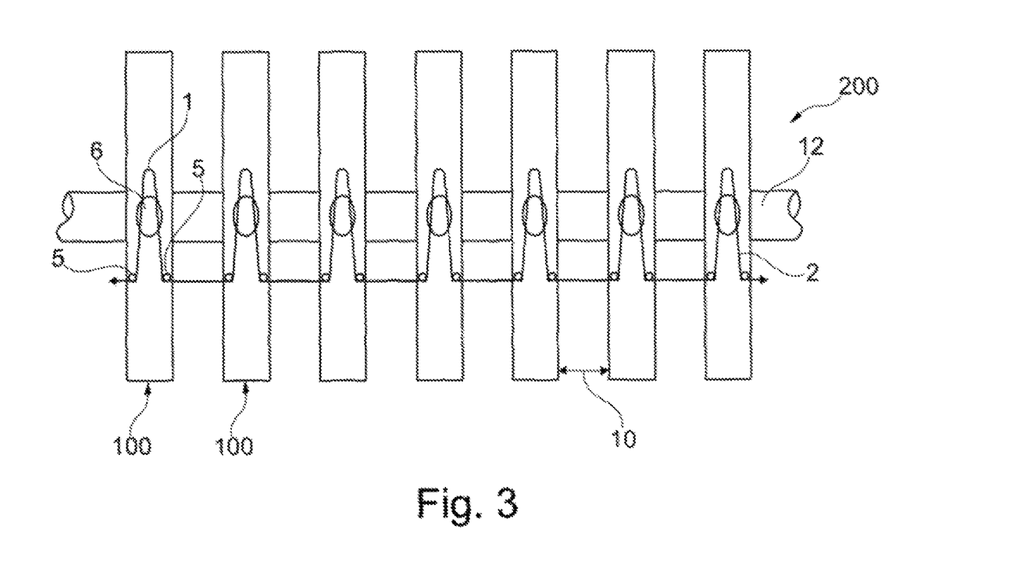
FIG. 3 shows the serial arrangement of multiple repeating units of a multi-needle machine according to an embodiment.

As is shown in FIG. 3, the repeating units 100 that are arranged on axis 12 are located at a constant distance from each other. It may be provided that some or all of said repeating units may be displaced axially with respect to the respective adjacent repeating units to vary the distances between them. Each of the repeating units comprises two pins 5 and one slider 1, which may be moved toward each other and past each other due to the rotating movement of the second device 4 and/or first device 11, so that, as can be seen in FIG. 3, the semi-finished textile product 2 may be made in a zigzag-like pattern.

Figure 4:
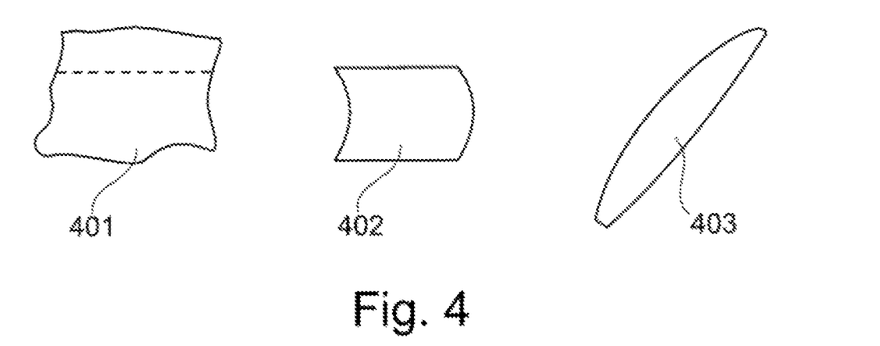
FIG. 4 shows three components that have been produced using the multi-needle machine according to an embodiment.

FIG. 4 shows three components that may be produced with the multi-needle machine described. Component 401 is a reinforced foam, component 402 is a structural element for a vehicle, for example an aircraft or a watercraft, and component 403 is the blade of a wind turbine.

Figure 5:
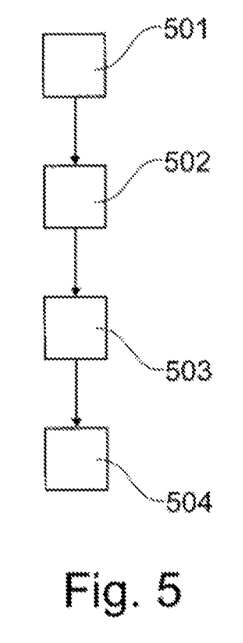
FIG. 5 is a flowchart of a method according to an embodiment.

FIG. 5 shows a flow diagram of a method according to an embodiment. In step 501, a semi-finished textile product is fed along a straight or only insignificantly curved path on the side of the rear surface of the material to be reinforced. In step 502, the pins of the repeating units are moved toward the corresponding sliders of the repeating units along a circular path, so that the semi-finished textile product is fixed in position between the pins and the sliders. In this way, a zigzag, wavy or trapezoidal pattern is created. In step 503, the needles mounted on a needle beam pick up the semi-finished textile product inside the repeating units and then travel in step 504 back through the material that is to be reinforced, pulling the semi-finished textile product into the holes. Afterwards, an infiltration of the material that is to be reinforced with resin may take place.

In addition, it should be noted that "comprising" and "including" do not exclude other elements or steps, and "one" or "a(n)" not exclude a plurality. It should further be noted that features or steps that have been described with reference to one of the preceding embodiments may also be used in combination with other features or steps of other described embodiments. Reference signs on the claims are not to be construed as limiting.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A repeating unit for a feed device of a multi-needle machine that initially positions a semi-finished textile product along a straight path, the repeating unit comprising:
   a first device;
   a slider mounted on the first device;
   a second device;
   at least one pin mounted on the second device, wherein at least one of the first and second devices is rotatably supported about an axis;
   a linear guide which passes through the first device and the second device parallel to the axis; and
   a carriage that feeds the semi-finished textile product between the slider and the at least one pin;
   wherein a rotation of the at least one of the first and second devices causes movement of the pin along a circular path and past the slider, and/or causes movement of the slider along a circular path and past the pin, to facilitate engagement of the semi-finished textile product with the slider and the at least one pin, and to facilitate displacement and arrangement of the semi-finished textile product along a cyclical, non-straight path in an area of a rear surface of a material to be reinforced.

2. The repeating unit according to claim 1, further comprising:
   a cylindrical housing, in which the first device and the second device are arranged.

3. The repeating unit according to claim 1, wherein the second device comprises a housing, and the first device is arranged inside the housing.

4. The repeating unit according to claim 1,
   wherein two pins are mounted on the second device parallel to one another and radially with respect to the axis;
   wherein the second device rotates relative to the first device; and
   wherein rotation of the second device relative to the first device causes a movement of the pins that takes the pins past the slider on opposite sides thereof.

5. The repeating unit according to claim 1, further comprising:
   a linear slider guide, which is constructed for linear guidance of the slider radially with respect to the axis.

6. A multi-needle machine for producing reinforced foams, reinforced textiles or combinations thereof, comprising:
   a plurality of repeating units, each for a feed device of the multi-needle machine, wherein the multi-needle machine initially positions a semi-finished textile product along a straight path, each of the repeating units comprising:
   a first device;
   a slider mounted on the first device;
   a second device;
   at least one pin mounted on the second device, wherein at least one of the first and second devices is rotatably supported about an axis;
   a linear guide which passes through the first device and the second device parallel to the axis; and
   a carriage that feeds the semi-finished textile product between the slider and the at least one pin; and
   an axle on which the repeating units are mounted such that the repeating units are displaced from each other;
   wherein a rotation of the at least one of the first and second devices causes movement of the pin along a circular path and past the slider, and/or causes movement of the slider along a circular path and past the pin, to facilitate engagement of the semi-finished textile product with the slider and the at least one pin, and to facilitate displacement and arrangement of the semi-finished textile product along a cyclical, non-straight path in an area of a rear surface of a material to be reinforced.

7. The multi-needle machine according to claim 6, further comprising:
 a needle beam that carries a plurality of needles;
 wherein the multi-needle machine carries the material to be reinforced between the needle beam and the repeating units.

8. The multi-needle machine according to claim 6, wherein distances between adjacent repeating units are variable.

9. The multi needle machine according to claim 6, wherein at least the first device or the second device of each repeating unit is rotatable about the axis, by an individual, predefinable angle.

* * * * *